(12) United States Patent
Berry et al.

(10) Patent No.: US 10,995,620 B2
(45) Date of Patent: May 4, 2021

(54) TURBOMACHINE COMPONENT WITH COATING-CAPTURING FEATURE FOR THERMAL INSULATION

(71) Applicant: GENERAL ELECTRIC COMPANY, Schenectady, NY (US)

(72) Inventors: Jonathan Dwight Berry, Simpsonville, SC (US); Srikanth Chandrudu Kottilingam, Greenville, SC (US)

(73) Assignee: General Electric Company, Schenectady, NY (US)

( * ) Notice: Subject to any disclaimer, the term of this patent is extended or adjusted under 35 U.S.C. 154(b) by 174 days.

(21) Appl. No.: 16/014,092

(22) Filed: Jun. 21, 2018

(65) Prior Publication Data
US 2019/0390553 A1 Dec. 26, 2019

(51) Int. Cl.
*F01D 5/28* (2006.01)
*F01D 5/14* (2006.01)

(52) U.S. Cl.
CPC ............ *F01D 5/147* (2013.01); *F01D 5/288* (2013.01); *F05D 2230/22* (2013.01); *F05D 2250/21* (2013.01); *F05D 2250/28* (2013.01); *F05D 2250/29* (2013.01); *F05D 2300/502* (2013.01)

(58) Field of Classification Search
CPC ...... F01D 5/147; F01D 5/288; F01D 2230/22; F01D 2250/21; F01D 2250/28; F01D 2250/29; F01D 2300/502; F05D 2230/22; F05D 2250/21; F05D 2250/28; F05D 2250/29; F05D 2300/502
See application file for complete search history.

(56) References Cited

U.S. PATENT DOCUMENTS

| | | |
|---|---|---|
| 5,419,971 A | 5/1995 | Skelly et al. |
| 6,074,706 A | 6/2000 | Beverley et al. |
| 6,652,227 B2 | 11/2003 | Fried |

(Continued)

FOREIGN PATENT DOCUMENTS

| | | |
|---|---|---|
| DE | 102011077620 A1 | 12/2012 |
| EP | 1491657 A1 | 12/2004 |

(Continued)

*Primary Examiner* — David E Sosnowski
*Assistant Examiner* — Sabbir Hasan
(74) *Attorney, Agent, or Firm* — James Pemrick; Hoffman Warnick LLC

(57) ABSTRACT

The disclosure relates to turbomachine components which include one or more coating-capturing features for thermal insulation. A turbomachine component may include: a body having an exterior surface positioned within a hot gas path (HGP) section of a turbomachine; and a coating-capturing feature mounted on the exterior surface of the body and in thermal communication with the HGP section of the turbomachine, wherein the coating-capturing feature comprises: a first member positioned on the exterior surface of the body, the first member having at least one outer sidewall defining a first perimeter of the coating-capturing feature, a second member positioned on the first member and having at least one outer sidewall defining a second perimeter of the coating-capturing feature, wherein the first member separates the second member from the exterior surface of the body, and an indentation positioned between the first and second members.

19 Claims, 10 Drawing Sheets

(56) References Cited

U.S. PATENT DOCUMENTS

| | | | |
|---|---|---|---|
| 7,479,328 B2 | 1/2009 | Roth-Fagaraseanu et al. | |
| 8,303,247 B2 | 11/2012 | Schlichting et al. | |
| 8,313,288 B2 | 11/2012 | Schlichting et al. | |
| 8,586,169 B2 * | 11/2013 | Namba | C23C 30/00 428/155 |
| 9,458,763 B2 * | 10/2016 | Roth-Fagaraseanu | B32B 3/12 |
| 9,605,555 B2 | 3/2017 | Witz et al. | |
| 2002/0146541 A1 * | 10/2002 | Fried | B22C 7/02 428/172 |
| 2002/0146584 A1 | 10/2002 | Fried | |

FOREIGN PATENT DOCUMENTS

| | | |
|---|---|---|
| EP | 1491658 A1 | 12/2004 |
| EP | 2952341 A1 | 3/2015 |

* cited by examiner

TURBOMACHINE COMPONENT WITH COATING-CAPTURING FEATURE FOR THERMAL INSULATION

STATEMENT REGARDING FEDERAL RIGHTS

This invention was made with government support under contract number DE-FE0023965 awarded by the U.S. Department of Energy. The government has certain rights in the invention.

BACKGROUND

The disclosure relates generally to turbomachine components with coating-capturing features, and additionally, to methods of forming and applying coatings a turbomachine component with coating-capturing features for thermal insulation.

Conventional manufacture of metal components generally includes milling or cutting away regions from a slab of material before treating and modifying the cut material to yield a part, which may have been simulated using computer models, e.g., in drafting software. Manufactured components which may be formed from metal can include, e.g., airfoil components for installation in a turbomachine such as an aircraft engine or power generation system. Additive manufacturing (AM) includes a wide variety of processes of producing a component through the successive layering of material rather than the removal of material. As such, additive manufacturing can create complex geometries without the use of any sort of tools, molds or fixtures, and with little or no waste material. Instead of machining components from solid billets of material, much of which is cut away and discarded, the only material used in additive manufacturing is what is required to shape the component. Additive manufacturing techniques typically include taking a three-dimensional computer aided design (CAD) file of the component to be formed, electronically slicing the component into layers, e.g., 18-102 micrometers thick, and creating a file with a two-dimensional image of each layer, including vectors, images or coordinates. The file may then be loaded into a preparation software system that interprets the file such that the component can be built by different types of additive manufacturing systems. In 3D printing, rapid prototyping (RP), and direct digital manufacturing (DDM) forms of additive manufacturing, material layers are selectively dispensed, sintered, formed, deposited, etc., to create the component.

In metal powder additive manufacturing techniques, such as direct metal laser melting (DMLM) (also referred to as selective laser melting (SLM)), metal powder layers are sequentially melted together to form the component. More specifically, fine metal powder layers are sequentially melted after being uniformly distributed using an applicator on a metal powder bed. Each applicator includes an applicator element in the form of a lip, brush, blade or roller made of metal, plastic, ceramic, carbon fibers or rubber that spreads the metal powder evenly over the build platform. The metal powder bed can be moved in a vertical axis. The process takes place in a processing chamber having a precisely controlled atmosphere. Once each layer is created, each two dimensional slice of the component geometry can be fused by selectively melting the metal powder. The melting may be performed by a high power melting beam, such as a 100 Watt ytterbium laser, to fully weld (melt) the metal powder to form a solid metal. The melting beam is moved or deflected in the X-Y direction, and has an intensity sufficient to fully weld (melt) the metal powder to form a solid metal. The metal powder bed may be lowered for each subsequent two dimensional layer, and the process repeats until the component is completely formed.

Various stationary and rotating components of a turbomachine, however manufactured, may be coated with temperature-resistant materials before being deployed within a turbomachine. Conventionally-designed components and coating materials are associated with technical risks, which may reduce the component's resistance to high temperatures during operation. One such risk is the occurrence of spalling of thermally-resistant coatings on the exterior surface of a component. Spalling refers to an undesirable breaking off of thermally resistant coatings from portions of a component. The risk of spalling is greatest at end-regions of a component with the most exposure to high-temperature fluids. Past attempts to prevent spalling have included, e.g., forming pins or other fixtures on a component's surface to anchor portions of a surface coating. These attempts, however, have exhibited a limited ability to transfer heat from exterior portions of the component into the component's base material, particularly after spalling occurs.

SUMMARY

A first aspect of the disclosure provides a turbomachine component comprising: a body having an exterior surface positioned within a hot gas path (HGP) section of a turbomachine; and a coating-capturing feature mounted on the exterior surface of the body and in thermal communication with the HGP section of the turbomachine, wherein the coating-capturing feature comprises: a first member positioned on the exterior surface of the body, the first member having at least one outer sidewall defining a first perimeter of the coating-capturing feature, a second member positioned on the first member and having at least one outer sidewall defining a second perimeter of the coating-capturing feature, wherein the first member separates the second member from the exterior surface of the body, and an indentation positioned between the first and second members.

A second aspect of the disclosure provides an apparatus comprising: a turbomachine component having an exterior surface for positioning within a hot gas path (HGP) section of a turbomachine; a coating-capturing feature mounted on the exterior surface of the turbomachine component and in thermal communication with the HGP section of the turbomachine, wherein the coating-capturing feature comprises: a first member positioned on the exterior surface of the turbomachine component, the first member having at least one outer sidewall defining a first perimeter of the coating-capturing feature, a second member positioned on the first member and having at least one outer sidewall defining a second perimeter of the coating-capturing feature, wherein the first member separates the second member from the exterior surface of the turbomachine component, and an indentation positioned between the first and second members; and a surface coating comprising: a base coating layer conformally coated on the exterior surface of the turbomachine component, the at least one sidewall of the first member of the coating-capturing feature, and the at least one sidewall of the second member of the coating-capturing feature, wherein the base coating layer is positioned at least partially within the indentation of the coating-capturing feature, and at least one thermal barrier coating (TBC) layer positioned on the base coating layer.

A third aspect of the disclosure provides a method for applying a coating to a turbomachine component, the method comprising: forming a coating-capturing feature on an exterior surface of the turbomachine component for positioning within a hot gas path (HGP) section of a turbomachine, wherein the coating-capturing feature comprises: a first member positioned on the exterior surface of the turbomachine component, the first member having at least one outer sidewall defining a first perimeter of the coating-capturing feature; and a second member positioned on the first member and having at least one outer sidewall defining a second perimeter of the coating-capturing feature, wherein the first member separates the second member from the exterior surface of the turbomachine component, and an indentation positioned between the first and second members; and forming a surface coating on the turbomachine component and the coating-capturing feature, such that at least a portion of the surface coating is positioned within the indentation of the coating-capturing feature.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As indicated above, the disclosure provides a turbomachine component with coating-capturing features to resist spalling and provide additional cooling during operation of a turbomachine. Each coating-capturing feature may be structured to retain larger amounts of surface coating material than conventional features positioned on a turbomachine airfoil, while permitting thermal conductivity into the body of a turbomachine airfoil. Each coating-capturing feature may include, e.g., a first member positioned on an exterior surface of the airfoil component positionable within a hot gas path (HGP) section of a turbomachine. The first member may include at least one outer sidewall to define a first perimeter of the coating-capturing feature. A second member may be positioned on the first member, and may also include one or more outer sidewalls to define a second perimeter of the coating-capturing feature. The first member thus separates the second member from the exterior surface of the turbomachine component. An indentation may be positioned within the coating-capturing feature between its first and second members to capture and retain surface coating material(s) therein. The first member may have a larger size (e.g., a greater width, thickness, surface area, etc.) than the second member to enhance heat transfer into the turbomachine component. Methods according to the disclosure include forming a surface coating on the coating-capturing features and the turbomachine component, such that at least a portion of the surface coating contacts and remains positioned within the indentation. The disclosure provides a structure and method for thermally insulating turbomachine components through the use of coating-capturing features as discussed herein.

Figure 1:
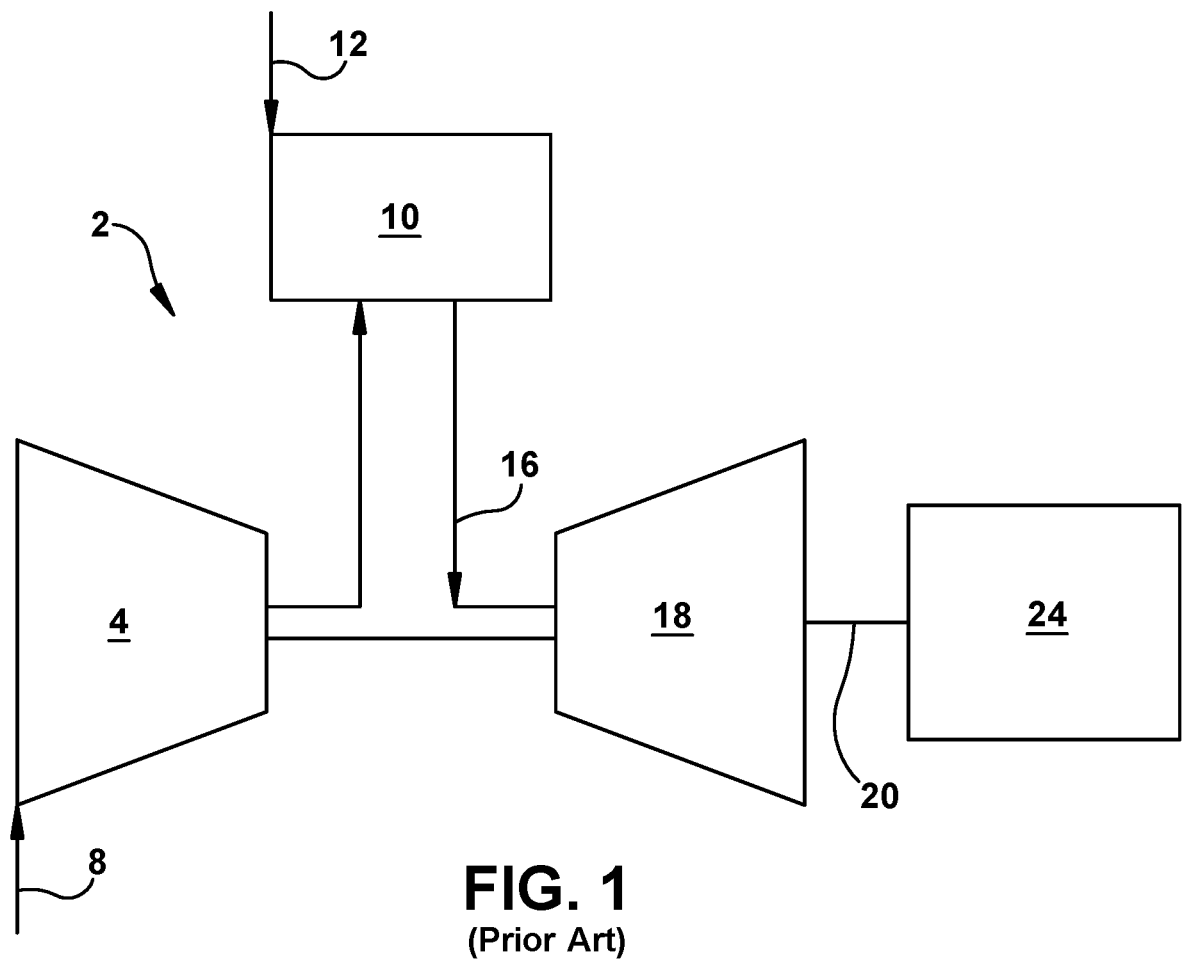
FIG. 1 is a schematic diagram of an illustrative industrial machine having a hot gas path (HGP) component in the form of a gas turbine system.

Referring now to the drawings, in which like numerals refer to like elements throughout the several views, FIG. 1 shows a schematic view of an illustrative industrial machine in the form of a turbomachine 2. While the disclosure will be described relative to turbomachine 2, it is emphasized that the teachings of the disclosure are applicable to any industrial machine having a hot gas path component requiring cooling. Turbomachine 2 may include a compressor 4. Compressor 4 compresses an incoming flow of air 8, and delivers the compressed flow of air 8 to a combustor 10. Combustor 10 mixes the compressed flow of air 8 with a pressurized flow of fuel 12 and ignites the mixture to create a flow of combustion gases 16. Although only a single combustor 10 is shown, turbomachine 2 may include any number of combustors 10. Flow of combustion gases 16 is in turn delivered to a turbine 18. Flow of combustion gases 16 drives turbine 18 so as to produce mechanical work. The mechanical work produced in turbine 18 drives compressor 4 via a rotor 20 and an external load 24 such as an electrical generator and the like.

Turbomachine 2 may use natural gas, liquid fuels, various types of syngas, and/or other types of fuels and blends thereof. Turbomachine 2 may be any one of a number of different gas turbine engines offered by General Electric Company of Schenectady, N.Y. and the like. Turbomachine 2 may have different configurations and may use other types of components. Teachings of the disclosure may be applicable to other types of gas turbine systems and or industrial machines using a hot gas path. Multiple gas turbine systems, or types of turbines, and or types of power generation equipment also may be used herein together.

Figure 2:
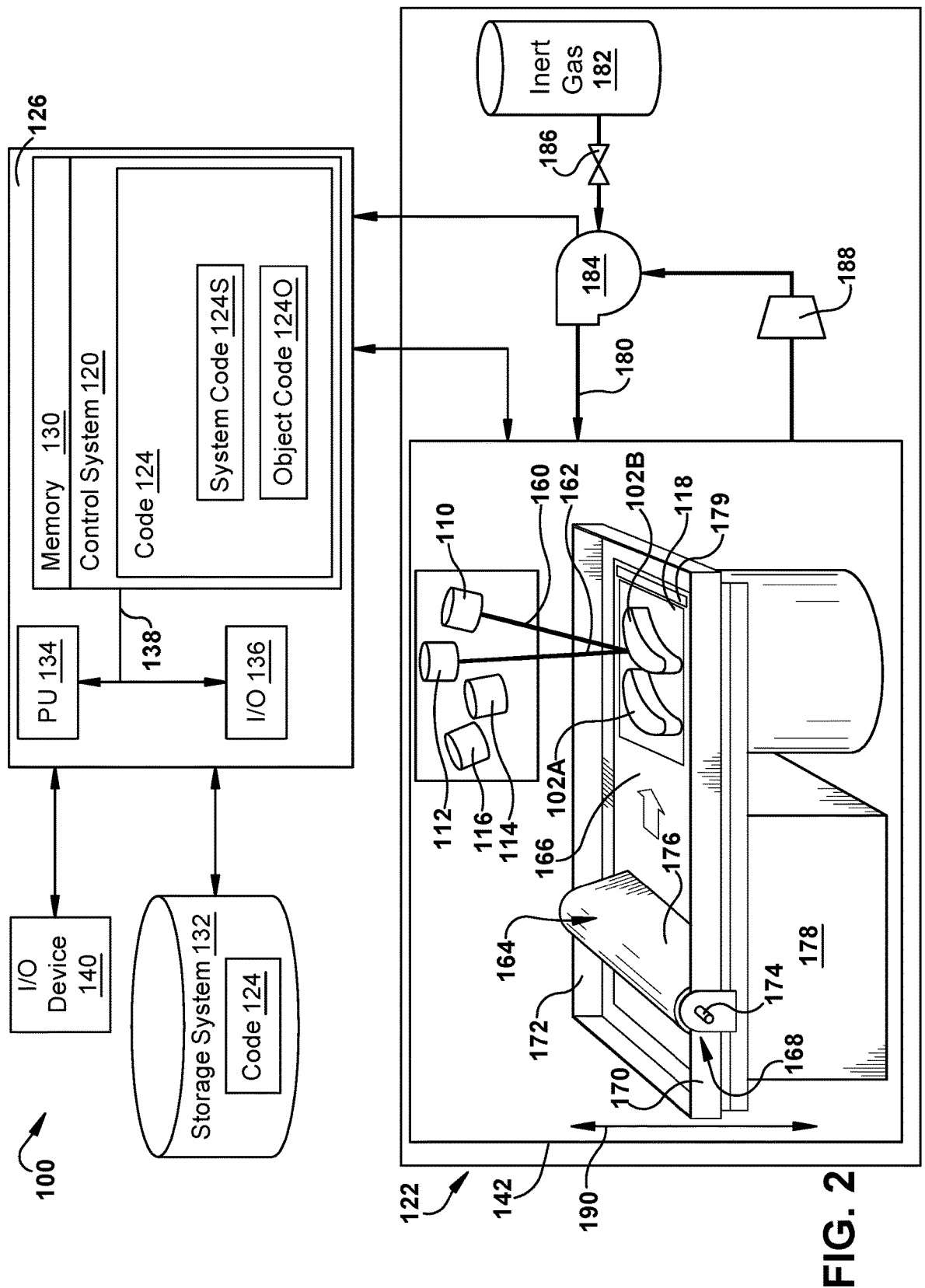
FIG. 2 shows a block diagram of an additive manufacturing system and process including a non-transitory computer readable storage medium storing code representative of a turbomachine component according to embodiments of the disclosure.

FIG. 2 shows a schematic/block view of an illustrative computerized metal powder additive manufacturing system 100 (hereinafter 'AM system 100') for initially generating additively manufactured (AM) component(s) 102, separately labeled as 102A and 102B in FIG. 2. AM component 102 may include one large AM component or multiple AM components, e.g., two AM components 102A, 102B as shown, of which only a single layer is shown. The teachings of the disclosure may be applied to AM component(s) 102 built using AM system 100. AM system 100 uses multiple melting beam sources, e.g., four lasers 110, 112, 114, 116, but it is emphasized and will be readily recognized that the teachings of the disclosure are equally applicable to build multiple AM components 102 or a single AM component 102 using any number of melting beam sources, i.e., one or more. In this example, AM system 100 is arranged for direct metal laser melting (DMLM). It is understood that the general teachings of the disclosure are equally applicable to other forms of metal powder additive manufacturing such as but not limited to direct metal laser sintering (DMLS), selective laser sintering (SLS), electron beam melting (EBM), and perhaps other forms of additive manufacturing. AM component(s) 102 are illustrated in FIG. 2 as elements with the geometrical profile of an airfoil; however, it is understood that the additive manufacturing process can be readily adapted to manufacture any shaped AM component, a large variety of AM components and a large number of AM components having internal openings and formed on a build platform 118.

AM system 100 generally includes a metal powder additive manufacturing control system 120 ("control system") and an AM printer 122. As will be described, control system 120 executes set of computer-executable instructions or program code 124 to generate AM component(s) 102 using multiple melting beam sources 110, 112, 114, 116. In the example shown, four melting beam sources may include four lasers. However, the teachings of the disclosures are applicable to any melting beam source, e.g., an electron beam, laser, etc. Control system 120 is shown implemented on computer 126 as computer program code. To this extent, computer 126 is shown including a memory 130 and/or storage system 132, a processor unit (PU) 134, an input/output (I/O) interface 136, and a bus 138. Further, computer 126 is shown in communication with an external I/O device/resource 140 and storage system 132.

In general, processor unit (PU) 134 executes computer program code 124 that is stored in memory 130 and/or storage system 132. While executing computer program code 124, processor unit (PU) 134 can read and/or write data to/from memory 130, storage system 132, I/O device 140 and/or AM printer 122. Bus 138 provides a communication link between each of the components in computer 126, and I/O device 140 can comprise any device that enables a user to interact with computer 126 (e.g., keyboard, pointing device, display, etc.). Computer 126 is only representative of various possible combinations of hardware and software. For example, processor unit (PU) 134 may comprise a single processing unit, or be distributed across one or more processing units in one or more locations, e.g., on a client and server. Similarly, memory 130 and/or storage system 132 may reside at one or more physical locations. Memory 130 and/or storage system 132 can comprise any combination of various types of non-transitory computer readable storage medium including magnetic media, optical media, random access memory (RAM), read only memory (ROM), etc. Computer 126 can comprise any type of computing device such as an industrial controller, a network server, a desktop computer, a laptop, a handheld device, etc.

As noted, AM system 100 and, in particular control system 120, executes program code 124 to generate AM component(s) 102. Program code 124 can include, inter alia, a set of computer-executable instructions (herein referred to as 'system code 124S') for operating AM printer 122 or other system parts, and a set of computer-executable instructions (herein referred to as 'object code 124O') defining AM component(s) 102 to be physically generated by AM printer 122. As described herein, additive manufacturing processes begin with a non-transitory computer readable storage medium (e.g., memory 130, storage system 132, etc.) storing program code 124. Set of computer-executable instructions for operating AM printer 122 may include any now known or later developed software code capable of operating AM printer 122.

Object code 124O defining AM component(s) 102 may include a precisely defined 3D model of an AM component 102 and can be generated from any of a large variety of well-known computer aided design (CAD) software systems such as AutoCAD®, TurboCAD®, DesignCAD 3D Max, etc. In this regard, object code 124O can include any now known or later developed file format. Furthermore, object code 124O representative of AM component(s) 102 may be translated between different formats. For example, object code 124O may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional AM component to be fabricated on any AM printer. Object code 124O representative of AM component(s) 102 may also be converted into a set of data signals and transmitted, received as a set of data signals and converted to code, stored, etc., as necessary. In any event, object code 124O may be an input to AM system 100 and may come from a part designer, an intellectual property (IP) provider, a design company, the operator or owner of AM system 100, or from other sources. In any event, control system 120 executes system code 124S and object code 124O, dividing AM component(s) 102 into a series of thin slices that assembles using AM printer 122 in successive layers of material.

AM printer 122 may include a processing chamber 142 that is sealed to provide a controlled atmosphere for AM component(s) 102 printing, e.g., a set pressure and temperature for lasers, or a vacuum for electron beam melting. Build platform 118, upon which AM component(s) 102 is/are built, is positioned within processing chamber 142. A number of melting beam sources 110, 112, 114, 116 are configured to melt layers of metal powder on build platform 118 to generate AM component(s) 102. While four melting beam sources 110, 112, 114, 116 will be described herein, it is emphasized that the teachings of the disclosure are applicable to a system employing any number of sources, e.g., 1, 2, 3, or 5 or more.

Continuing with FIG. 2, an applicator 164 may create a thin layer of raw material 166 spread out as the blank canvas from which each successive slice of the final AM component will be created. Applicator 164 may move under control of a linear transport system 168. Linear transport system 168 may include any now known or later developed arrangement for moving applicator 164. In one embodiment, linear transport system 168 may include a pair of opposing rails 170, 172 extending on opposing sides of build platform 118, and a linear actuator 174 such as an electric motor coupled to applicator 164 for moving it along rails 170, 172. Linear actuator 174 is controlled by control system 120 to move applicator 164. Other forms of linear transport systems may also be employed. Applicator 164 may take a variety of forms. In one embodiment, applicator 164 may include a member 176 configured to move along opposing rails 170, 172, and an actuator element (not shown in FIG. 2) in the form of a tip, blade or brush configured to spread metal powder evenly over build platform 118, i.e., build platform 118 or a previously formed layer of AM component(s) 102, to create a layer of raw material. The actuator element may be coupled to member 176 using a holder (not shown) in any number of ways.

The process may use different raw materials 166 in the form of metal powder. Raw materials 166 may be provided to applicator 164 in a number of ways. In one embodiment, shown in FIG. 2, a stock of raw material 166 may be held in a raw material source 178 in the form of a chamber accessible by applicator 164. In other arrangements, raw material may be delivered through applicator 164, e.g., through member 176 in front of its applicator element and over build platform 118. In any event, an overflow chamber 179 may be provided on a far side of applicator 164 to capture any overflow of raw material not layered on build platform 118. In FIG. 2, only one applicator 164 is shown. In some embodiments, applicator 164 may be among a plurality of applicators in which applicator 164 is an active applicator and other replacement applicators (not shown) are stored for use with linear transport system 168. Used applicators (not shown) may also be stored after they are no longer usable.

In one embodiment, AM component(s) 102 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc. In another example, the metal may include practically any metal such as but not limited to: tool steel (e.g., H13), titanium alloy (e.g., $Ti_6Al_4V$), stainless steel (e.g., 316L) cobalt-chrome alloy (e.g., CoCrMo), and aluminum alloy (e.g., $AlSi_{10}Mg$). In another example, the metal may include a gamma prime hardened superalloy such as but not limited to nickel-based superalloys like Inconel 738, MarM 247 or CM247, or cobalt-based superalloys such as but not limited to those known under their brand names: IN738LC, Rene 108, FSX 414, X-40, X-45, MAR-M509, MAR-M302 or Merl 72/Polymet 972.

The atmosphere within processing chamber 142 is controlled for the particular type of melting beam source being used. For example, for lasers, processing chamber 142 may be filled with an inert gas such as argon or nitrogen and controlled to minimize or eliminate oxygen. Here, control system 120 is configured to control a flow of an inert gas mixture 180 within processing chamber 142 from a source of inert gas 182. In this case, control system 120 may control a pump 184, and/or a flow valve system 186 for inert gas to control the content of gas mixture 180. Flow valve system 186 may include one or more computer controllable valves, flow sensors, temperature sensors, pressure sensors, etc., capable of precisely controlling flow of the particular gas. Pump 184 may be provided with or without valve system 186. Where pump 184 is omitted, inert gas may simply enter a conduit or manifold prior to introduction to processing chamber 142. Source of inert gas 182 may take the form of any conventional source for the material contained therein, e.g. a tank, reservoir or other source. Any sensors (not shown) required to measure gas mixture 180 may be provided. Gas mixture 180 may be filtered using a filter 188 in a conventional manner. Alternatively, for electron beams, processing chamber 142 may be controlled to maintain a vacuum. Here, control system 120 may control a pump 184 to maintain the vacuum, and flow valve system 186, source of inert gas 182, and/or filter 188 may be omitted. Any sensors (not shown) necessary to maintain the vacuum may be employed.

A vertical adjustment system 190 may be provided to vertically adjust a position of various parts of AM printer 122 to accommodate the addition of each new layer, e.g., a build platform 118 may lower and/or chamber 142 and/or applicator 164 may rise after each layer. Vertical adjustment system 190 may include any now known or later developed linear actuators to provide such adjustment that are under the control of control system 120.

In operation, build platform 118 with metal powder thereon is provided within processing chamber 142, and control system 120 controls the atmosphere within processing chamber 142. Control system 120 also controls AM printer 122, and in particular, applicator 164 (e.g., linear actuator 174) and melting beam source(s) 110, 112, 114, 116 to sequentially melt layers of metal powder on build platform 118 to generate AM component(s) 102 according to embodiments of the disclosure. As noted, various parts of AM printer 122 may vertically move via vertical adjustment system 190 to accommodate the addition of each new layer, e.g., a build platform 118 may lower and/or chamber 142 and/or applicator 164 may rise after each layer.

Figure 3:
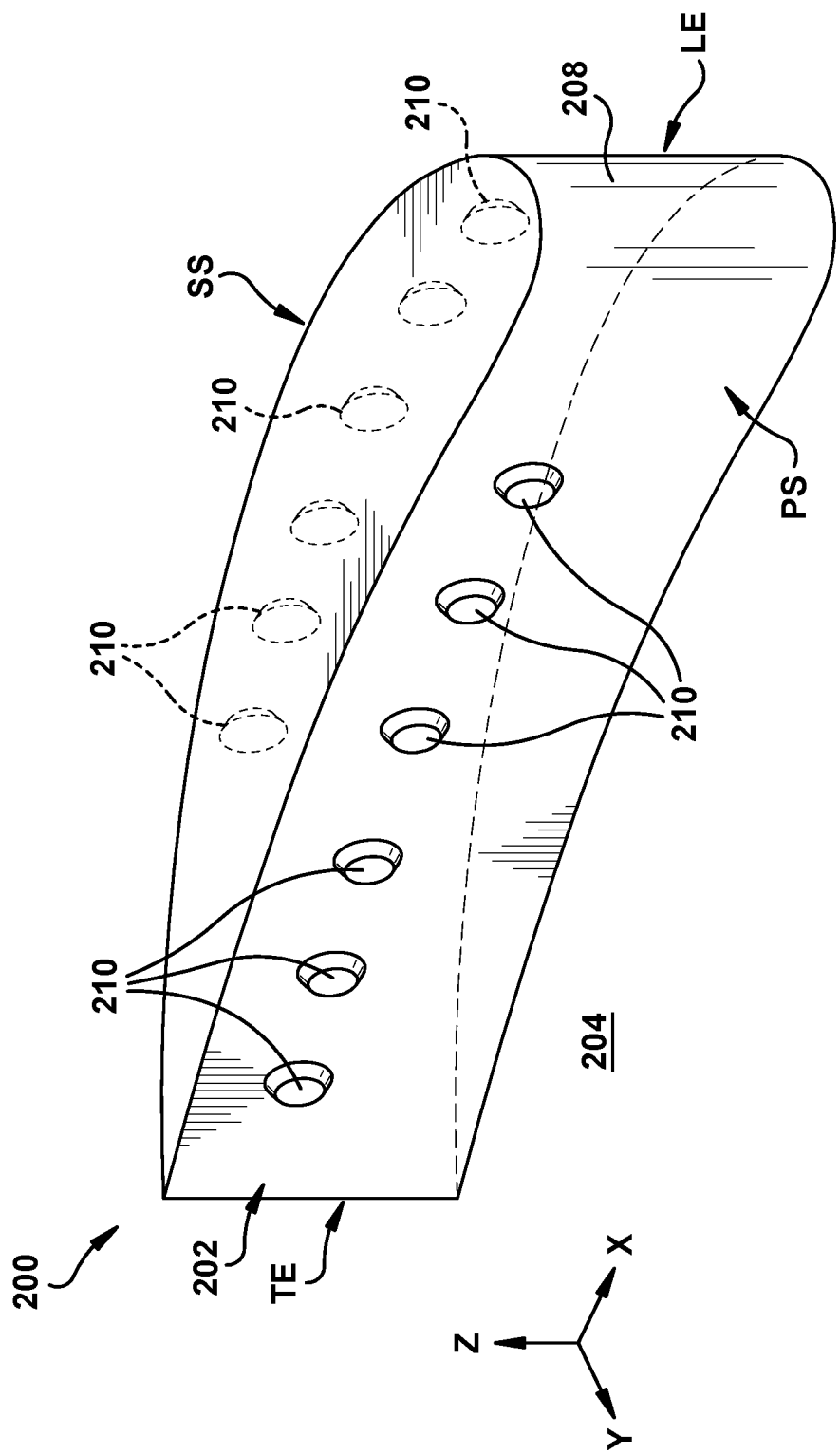
FIG. 3 shows a perspective view of an embodiment of a turbomachine component with coating-capturing features according to embodiments of the disclosure.

FIG. 3 shows an example of a turbomachine component 200, which may take the form of one or more of AM components 102 (FIG. 2) discussed elsewhere herein. Turbomachine component 200 may be made by any metal powder additive manufacturing process, such as that described relative to FIG. 2. Turbomachine component 200 may be made using any of the above-described metal powders. According to further embodiments, turbomachine component 200 may include one or more cast metals and/or non-additively manufactured materials. Such materials may be used in conjunction with, or as a substitute for, one or more of the various example laser-sinterable metals and/or other additively manufactured materials discussed elsewhere herein. In such cases, turbomachine component 200 may include aluminum, titanium, nickel, cobalt, iron, and/or other currently known or later developed metals. Cast metals may also include one or more of stainless steel, steel-based composite materials, alloys, superalloys, and/or other materials which may be formed by casting. In any case, turbomachine component 200 includes a body 202 to be positioned within a hot gas path (HGP) section 204 of a turbomachine, e.g., turbomachine 2 (FIG. 0.1). Turbomachine component 200 thus may include without limitation a nozzle, rotating blade, wheel, diaphragm, shroud, etc. and/or other parts in thermal communication with hot gases flowing through HGP section 204. Although turbomachine component 200 is shown solely for explanation as having the shape of an airfoil, it is understood that turbomachine component 200 may also include non-airfoil structures, including wheels, diaphragms, shrouds, etc., as noted above.

According to the example of FIG. 3 and as discussed herein, body 202 provides the shape of turbomachine component. Turbomachine component 200 may be any rotatable or non-rotatable hot gas path (HGP) component such as a turbomachine blade or nozzle, and it is understood that turbomachine component 200 more generally could take the form of any component positioned within an HGP section of a gas turbine, steam turbine, and/or other turbomachine assembly. Body 202 may include one or more laser-sintered metals usable in additive manufacture (AM) as described elsewhere herein. Body 202 of turbomachine component 200 includes multiple surfaces each configured for engagement with other components and/or forming one part of a single turbomachine component. Body 202 may be configured to engage a radially outboard component of a turbomachine, e.g., a wheel or similar component, and may include interlocking features such as dovetails, rivets, pins, etc., for coupling turbomachine component 200 to other structures. The term "radially" in the context of a turbomachine component refers to the line of travel leading toward or away from the centerline axis of the turbomachine. In the case of a blade extending outward from the turbomachine's centerline axis, a length of the blade may extend substantially along the radial direction. A radially "outward" or "outboard" direction refers to the heading facing away from the axis of rotor 20 (FIG. 1), while the radially "inward" or "inboard" direction refers to the heading facing toward the axis of rotor 20. In embodiments where the cross-section of body 202 magnifies, shrinks, tapers, etc., body 202 may substantially maintain a uniform geometrical profile from end to end.

Body 202 may include an exterior surface 208 extending continuously about body 202 of turbomachine component 200. Exterior surface 208 may be shaped to define airfoil cross-section configured for deployment within a hot gas path (HGP) region of turbomachine 2 (FIG. 1). For example, exterior surface 208 may include one or more of, e.g., a leading edge LE, a trailing edge TE, a suction side surface SS, and a pressure side surface PS. Pressure side surface PS and suction side surface SS may be distinguished from each other based on whether fluids flowing across turbomachine component 200 exert positive or negative resultant pressures against the corresponding portion(s) of perimeter region(s) 208.

Figure 4:
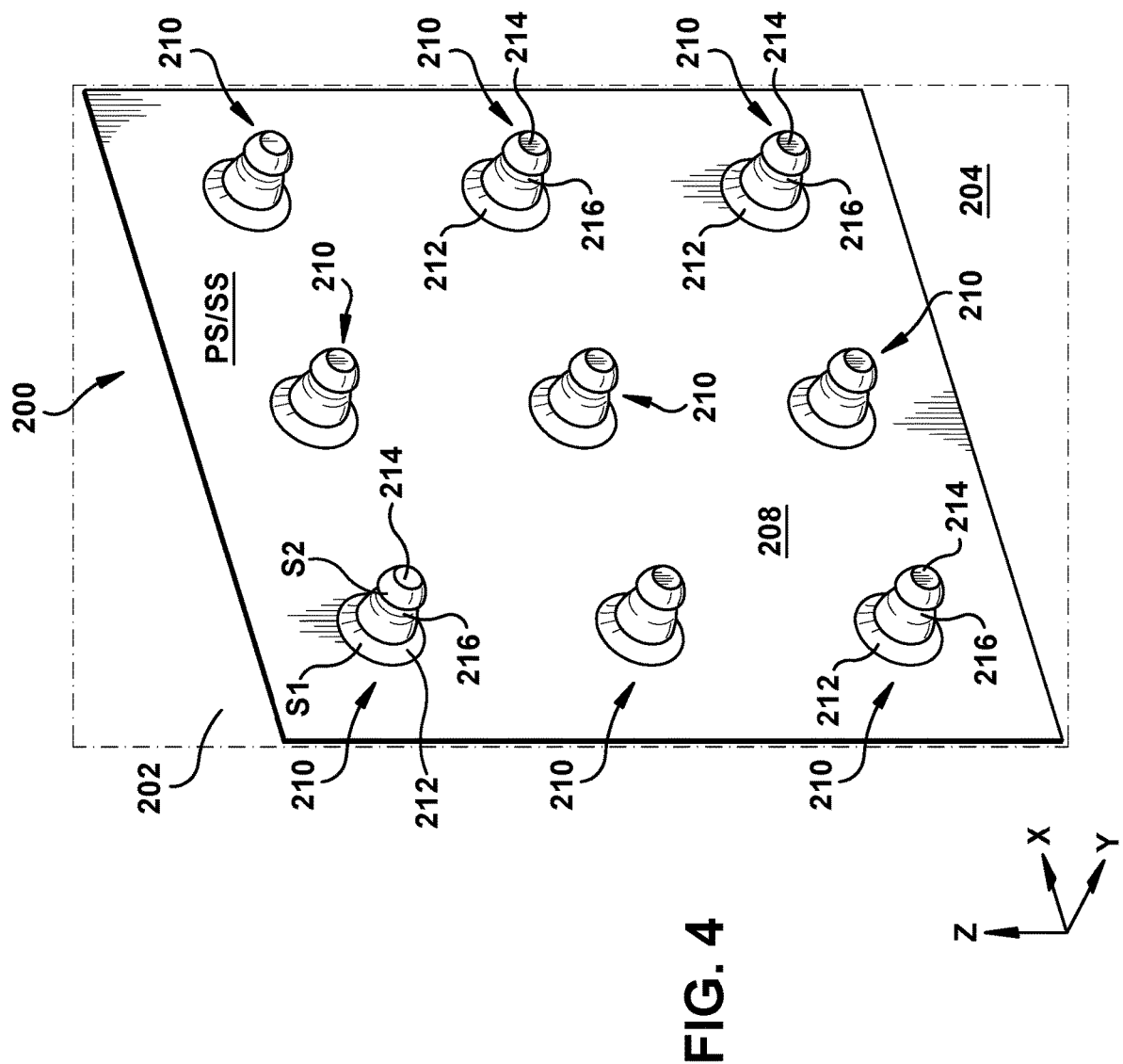
FIG. 4 shows an enlarged perspective view of an exterior surface of a turbomachine component with coating-capturing features according to embodiments of the disclosure.
Figure 5:
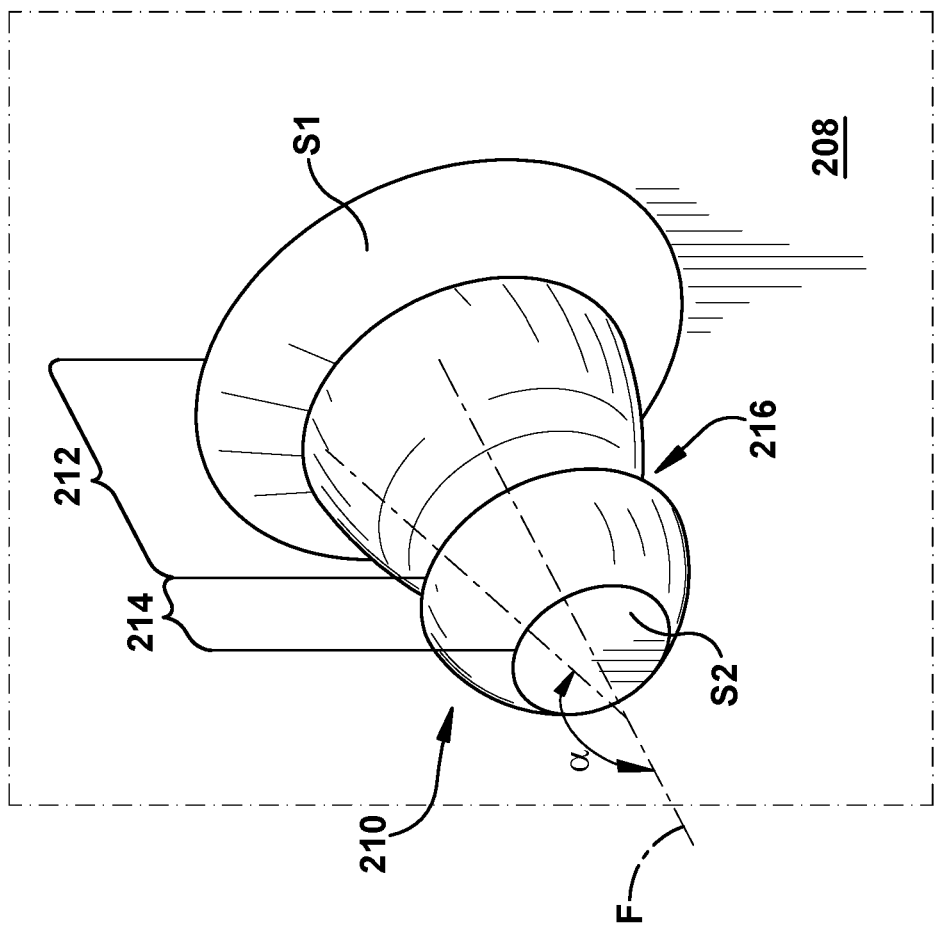
FIG. 5 shows a perspective view of a coating-capturing feature according to embodiments of the disclosure.

Referring to FIGS. 3-5 together, turbomachine component 200 may include one or more coating-capturing features 210 shaped to receive portions of a surface coating as discussed herein. Each coating-capturing feature 210 may be positioned on exterior surface 208 to extend outward from body 202 of turbomachine component 200. Coating-capturing features 210 may be shaped, dimensioned, etc., to reduce or prevent spalling of thermal coating materials positioned thereon, as compared to conventional structures adapted for placement on body 202, e.g., pins and/or other protrusions. Each coating-capturing feature 210 may be formed continuously with the remainder of turbomachine component 200, and thus may include one or more laser-sintered metals as discussed herein. Coating-capturing features 210 additionally may form part of AM component(s) 102 (FIG. 2) in various embodiments. In alternative embodiments, coating-capturing features 210 may be formed separately from turbomachine component 200 before subsequently being coupled to body 202 of turbomachine component 200, e.g., with an adhesive material as discussed with respect to FIG. 8.

Figure 6:
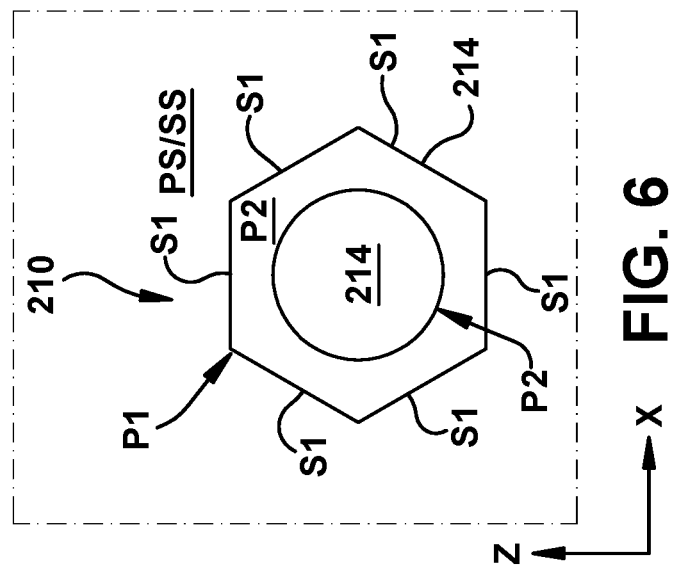
FIG. 6 shows a cross-sectional view in plane X-Z of a coating-capturing feature according to embodiments of the disclosure.

Each coating-capturing feature 210 may be subdivided into a series of distinct members, as shown in greater detail in FIGS. 4-6. A first member 212 of coating-capturing feature 210 may be mounted on exterior surface 208 of body 202, and may be shaped to include at least one sidewall S1 defining an outer perimeter P1 (FIG. 6 only) of first member 212. Where first member 212 exhibits a rounded shape, a single sidewall S1 may be included, while non-rounded embodiments of first member 212 may include multiple sidewalls S1. In the example of FIG. 6, first member 212 includes six sidewalls S1. First member 212 may have a non-uniform geometrical profile, and as shown in the examples of FIGS. 4 and 5 may be inwardly tapered such that first member 212 becomes more narrow as it extends outward from body 202. Coating-capturing feature(s) 210 may also include a second member 214 positioned on first member 212 with a distinct geometry as compared to first member 212. Specifically, second member 214 may include at least one sidewall S2 defining a second perimeter P2 (FIG. 6 only) that is smaller than first perimeter P1 of first member 212. In the example of FIG. 6, second member 214 is shown to include a single, rounded sidewall S2, but it is understood that second member 214 may include multiple sidewalls in the case of a non-rounded configuration. Second member 214 may also feature a different shape, volume, and/or geometrical characteristics as compared to first member 212. In the example of FIGS. 4 and 5, members 212, 214 of each coating-capturing feature 210 gradually decrease in width as they extend outward from body 202, thereby substantially forming a pawn-type shape. According to an example, first member 212 may have a substantially frusto-conical or frusto-pyramidal shape while second member 214 may have a substantially spheroidal shape. In this case, second member 214 may exhibit a smaller volume, perimeter, and surface area than first member 212.

Coating-capturing feature 210 may also include one or more indentations 216 (FIGS. 4, 5) positioned vertically between, e.g., sidewall(s) S1 of first member 212 and sidewall(s) S2 of second member 214. Indentation 216 may be positioned directly between first and second members 212, 214 such that the width of coating-capturing feature 210 narrows at indentation 216, and then expands at second member 214. Although second member 214 may have a smaller lateral width above body 202 than first member 212, indentation 216 may curve inward to be narrower than portions of first and second members 212, 214 of coating-capturing feature 210. According to an example, indentation 216 may curve inwardly at an angle different from an angular orientation of sidewall(s) S1, S2. More specifically, indentation 216 may have an angular orientation that is substantially obtuse with respect to the angular orientation of coating-capturing feature 210, indicated by line F in FIG. 5. As also shown in FIG. 5, second member 214 may curve inward at indentation 216, such that indentation 216 extends at an obtuse angle α with respect to the orientation of coating-capturing feature 210. Sidewall(s) S1 of first member 212 may similarly curve inward to indentation 216 at an obtuse angle with respect to the orientation of coating-capturing feature 210. In any case, indentation 216 defines a junction between first member 212 and second member 214 on coating-capturing feature 210. Coating-capturing features 210 each may include indentation 216 to receive and retain portions of a surface coating as it is applied to body 202 of turbomachine component 200. A conformally coated material will be positioned at least partially within indentation 216 of coating-capturing feature 210, in addition to being formed on body 202 of turbomachine component 200. Although the lateral width of coating-capturing feature(s) 210 otherwise decreases in proportion with distance from body 202, the width of coating-capturing feature 210 may slightly increase from within indentation 216 to second member 214.

The shape and position of members 212, 214 and indentation 216 within coating-capturing feature 210 provide greater thermal protection than conventional structures positioned on airfoil structures, e.g., cylindrical pins. Conventional structural configurations to retain barrier coatings on turbomachine component 200 have not been satisfactory for maintaining a low metal temperature while protecting coating materials from spalling or other technical obstacles. Indentation 216 as discussed herein may create a pocket of space where coating material may be less vulnerable to hot gases in a turbomachine HGP. In addition, the larger volume of first member 212 as compared to second member 214 (provided, e.g., by having a larger circumference, surface area, perimeter, etc.), allows coating-capturing feature 210 to transmit heat into body 202 without thermal impediments that may occur in other structures. For example, a conventional feature may not feature a decreasing lateral width (e.g., as shown in first and second members 212, 214). While cylindrical or non-indented geometries may offer a more uniform heat transfer profile, such geometries lack indentations 216 where coating materials may be captured. Thus, the shape and dimensions of each member 212, 214 of coating-capturing feature 210 allow thermal energy to migrate from second member 214 to first member 212 to body 202, and the presence of indentation 216 simultaneously allows more coating materials to be formed on turbomachine component 200 than may be possible in conventional structures.

Figure 7:
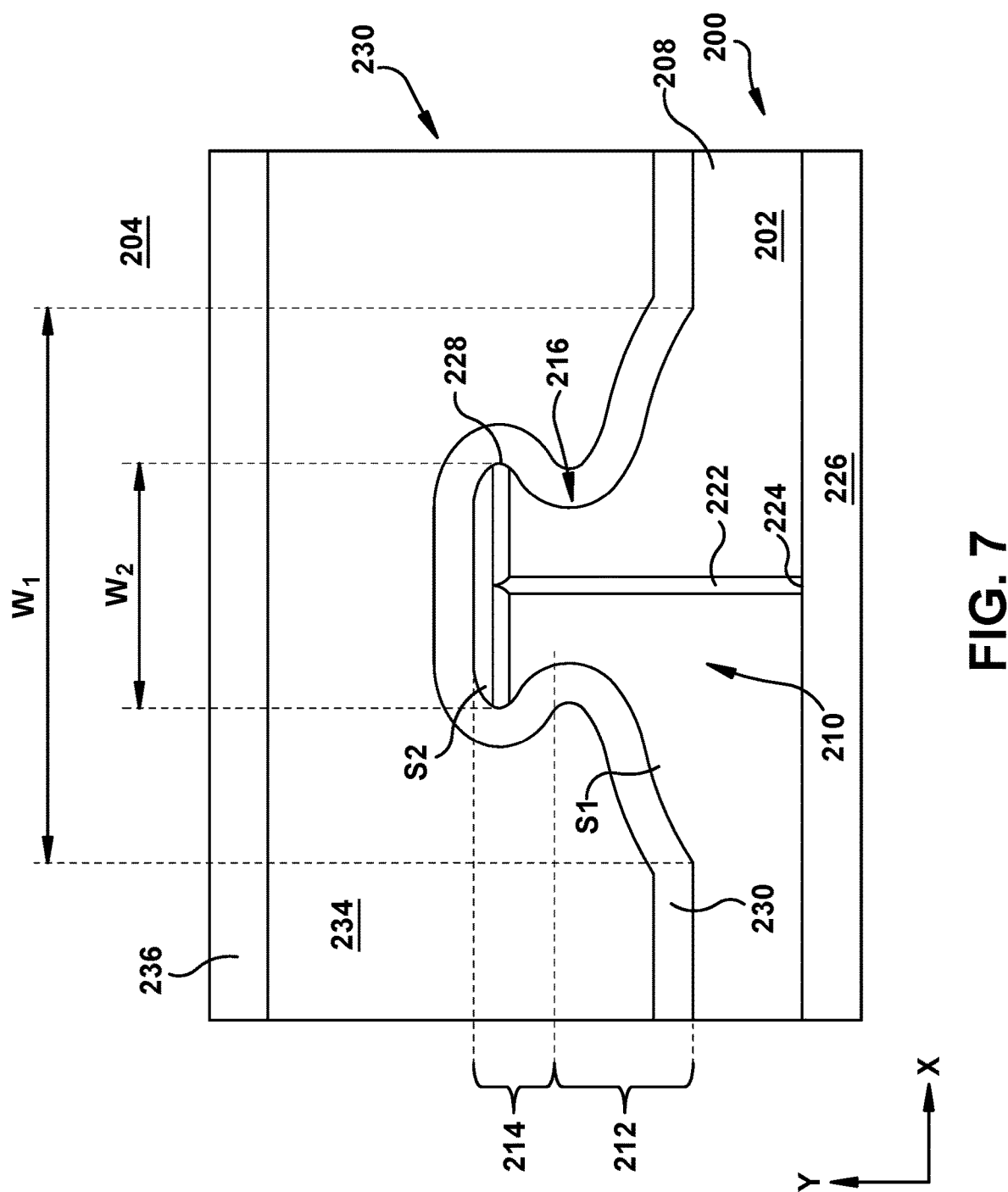
FIG. 7 shows a cross-sectional view in plane X-Y of coating-capturing feature and surface coating on a turbomachine component according to embodiments of the disclosure.

Turning to FIG. 7, additional features of coating-capturing feature(s) 210 are shown with coating materials formed on turbomachine component 200. Cooling circuits are one type of interior structural feature which may be included within turbomachine component 200 and at least partially within coating-capturing feature(s) 210. As shown, coating-capturing feature(s) 210 optionally may include at least one cooling passage 222 shaped to deliver one or more cooling fluids to targeted portions of coating-capturing feature(s) 210. Each cooling passage 222 may be sized to transmit one or more cooling fluids (e.g., liquid and/or gas refrigerants, air or gas routed from a cooling fluid reservoir and/or other portions of a turbomachine (e.g., compressor 4)) through turbomachine component 200 under specific conditions. Cooling passage 222 of coating-capturing feature 210 may form only part of a larger cooling circuit for turbomachine component 200, and thus may be in fluid communication with other regions for receiving and/or transmitting cooling fluid(s) throughout a structure. As shown in the cross-sectional view of FIG. 7, cooling passage 222 may include an inlet 224 fluidly coupled to an interior 226 of body 202. Interior 226 may include or otherwise be in fluid communication with a source of cooling fluids to be transmitted through cooling passage 222 of coating-capturing feature 210. Cooling passage 222 may also include one or more outlets 228 fluidly coupled to the outside of coating-capturing feature 210 near sidewall(s) S1 of first member 212 or second member 214, e.g., at indentation 216. As discussed elsewhere herein, cooling passage 222 of coating-capturing feature 210 may initially be covered by portions of a surface coating 230, and thus is unable to transmit cooling fluids through outlet 228 to HGP section 204. As discussed in further detail elsewhere herein, any surface coating materials removed during a spall event may uncover outlet 228 and allow transmission of cooling fluids through outlet 228 as a secondary cooling mechanism before surface coating(s) 230 are re-applied to coating-capturing feature 210.

The position of surface coating 230 formed on coating-capturing feature 210 demonstrates technical advantages of the present disclosure. As shown, surface coating 230 may be formed to include multiple layers. As shown, first member 212 of coating-capturing feature 210 may have a first width $W_1$ in plane X-Y that is smaller than a second width $W_2$ of second member 214 in plane X-Y. The different sizes of each member 212, 214 of coating-capturing feature 210 (shown, e.g., by widths W1, W2 and/or perimeters P1, P2 (FIG. 6) may allow a portion of surface coating 230 to be formed and retained within indentation 216. Portions of surface coating 230 retained within indentation 216 may be particularly resistant to mechanical shocks and/or high-temperature fluids within a turbomachine HGP. Additionally, portions of surface coating 230 may be positioned at or near outlet(s) 228 from cooling passage 222, thereby allowing cooling fluids to flow into HGP section 204 in the event of a spall. Upon being formed on turbomachine component 200, portions of surface coating 230 will be "captured" within indentation(s) 216 of coating-capturing features 210, and thereby held in place when turbomachine component 200 is deployed. The captured portions of surface coating 230 within indentation(s) 216 will further reduce the temperature of turbomachine component 200 by providing additional thermal conductivity therefrom. The captured amounts of surface coating 230 thus allow less cooling fluids to be used for cooling turbomachine component 200, while still providing reduced metal temperatures and a reduced need for more complex, expensive metal alloys. The structural characteristics of coating-capturing feature(s) 210 also permit surface coating 230 to be formed with a greater thickness as compared to conventional airfoil structures.

Surface coating 230 may include multiple layers. A base coating layer 232 may be conformally coated on the selected portion of pressure side surface PS or suction side surface SS of body 202, in addition to being formed on members 212, 214 and within indentation 216 of coating-capturing feature(s) 210. Base coating layer 232 may be formed to protect the material composition of body 202 and coating-capturing feature(s) 210 (e.g., laser-sintered metals) from contamination or degradation from overlying thermal coatings. Base coating layer 232 may include, e.g., a metallic bond coating layer formed of a ceramic-metal composite capable of adhering to an underlying layer of metal. Such materials may include, e.g., aluminum oxide, aluminum nitride, and/or other metallic or non-metallic materials capable of bonding to metals and/or ceramics.

Surface coating 230 may include other coating layers and/or materials in addition to base coating layer 232. A first thermal barrier coating (TBC) layer 234 may be positioned on base coating layer 232, such that first TBC layer 234 completely covers coating-capturing feature(s) 210 after being formed. First TBC layer 234 may include one or more thermally conductive ceramic materials, and where applicable may be formed of a material capable of being bonded to base coating layer 232. Ceramic materials appropriate for use within first TBC layer 234 may include, for example, yttria-stabilized zirconia (YSZ), Mullite (a low-density compound formed of alumina and silica), Alumina (e.g., one or more alpha-phase aluminum oxides), YSZ combined with other ceramics, e.g., Ceria ($CeO_2$), metal-glass composite materials, and/or other materials such as rare earth zirconates and/or rare earth metal oxides. First TBC layer 234 may substantially define a contoured airfoil profile to be placed within the HGP of a turbomachine. Where desired or applicable, a second TBC layer 236 may also be formed on first TBC layer 236, thereby causing surface coating 230 to include three layers in this example. Second TBC layer 236 may have the same material composition as first TBC layer 234, or may have a different composition to provide a desired thermal conductivity profile on turbomachine component 200. It is possible for each layer 232, 234, 236 of surface coating 230 to have the same material composition, or different material compositions.

Outlet(s) 228 of cooling passage(s) 222 may be positioned on coating-capturing features 210, and underneath surface coating 230. Although cooling passage(s) 222 may be in fluid communication with a supply of cooling fluids, e.g., within interior 226 of body 202, cooling passage(s) 222 may initially provide little to no cooling of body 202 and coating-capturing feature 210. That is, surface coating 230 may absorb and thermally conduct substantially all heat from HGP section 204 upon when turbomachine component 200 is deployed. Although coating-capturing 210 is structured to resist degradation of surface coating 230 in most instances, it is still possible for spalling to occur. The size and shape of second member 214 relative to first member 212 thus may concentrate any possible spalling to the upper portions of coating-capturing feature 210. In this case, any partial degradation or removing of surface coating 230 will likely concentrate near the location of outlet(s) 228 from cooling passage(s) 222. In the event that surface coating 230 degrades to reveal outlet(s) 228, cooling fluids may be directed to coating-capturing feature(s) 210 as a temporary cooling solution. That is, turbomachine component 200 may be cooled using fluids in cooling passage(s) 222 in the event that surface coating 230 degrades, until a servicer or operator replace any lost portions of surface coating(s) 230 on turbomachine component 200. The secondary cooling functions of cooling passage(s) 222 thus allow turbomachine component 200 to operate for longer periods than conventional structures which may experience spalling and/or loss of thermal protectants.

Figure 8:
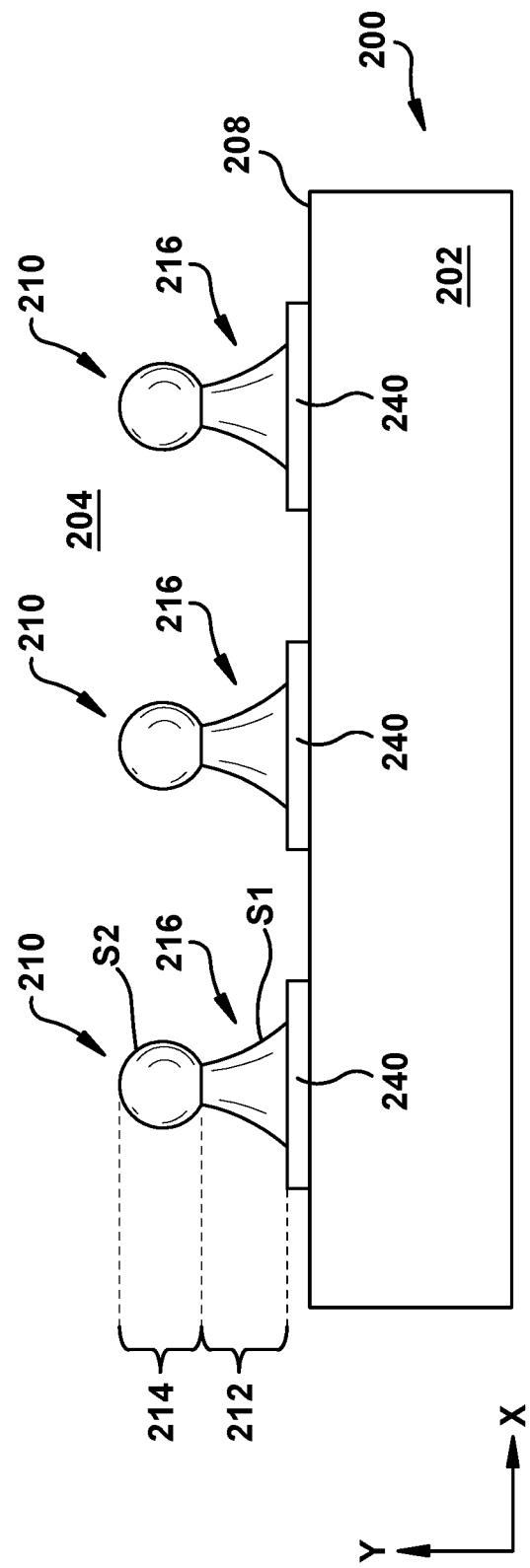
FIG. 8 shows a side view in plane X-Y of coating-capturing features adhesively bonded to a surface according to embodiments of the disclosure.

Referring now to FIG. 8, coating-capturing feature(s) 210 may be formed separately from body 202 of turbomachine component 200 in some instances, and thus mechanically coupled to each other with intervening materials. As shown, an adhesive material 240 may mechanically bond first member 212 to external surface 208 of body 202. Adhesive material 240 may be desirable in some cases, e.g., where a component is re-coated with surface coating(s) 230 (FIG. 7) after being deployed in a turbomachine over a time interval. Adhesive material 240 may include, e.g., one or more thermally-conductive bonding materials known in the art, including polymerous materials capable of mechanically coupling two metals together. In further embodiments, adhesive material 240 may include weld bonds and/or other mechanical couplings suitable for joining two or more metal components to each other. Mounting additional coating-capturing features 210 on body 202 with adhesive material 240 may allow a manufacturer or servicer to adjust the number of coating-capturing features 210 from their original number at the time of deployment.

Figure 9:
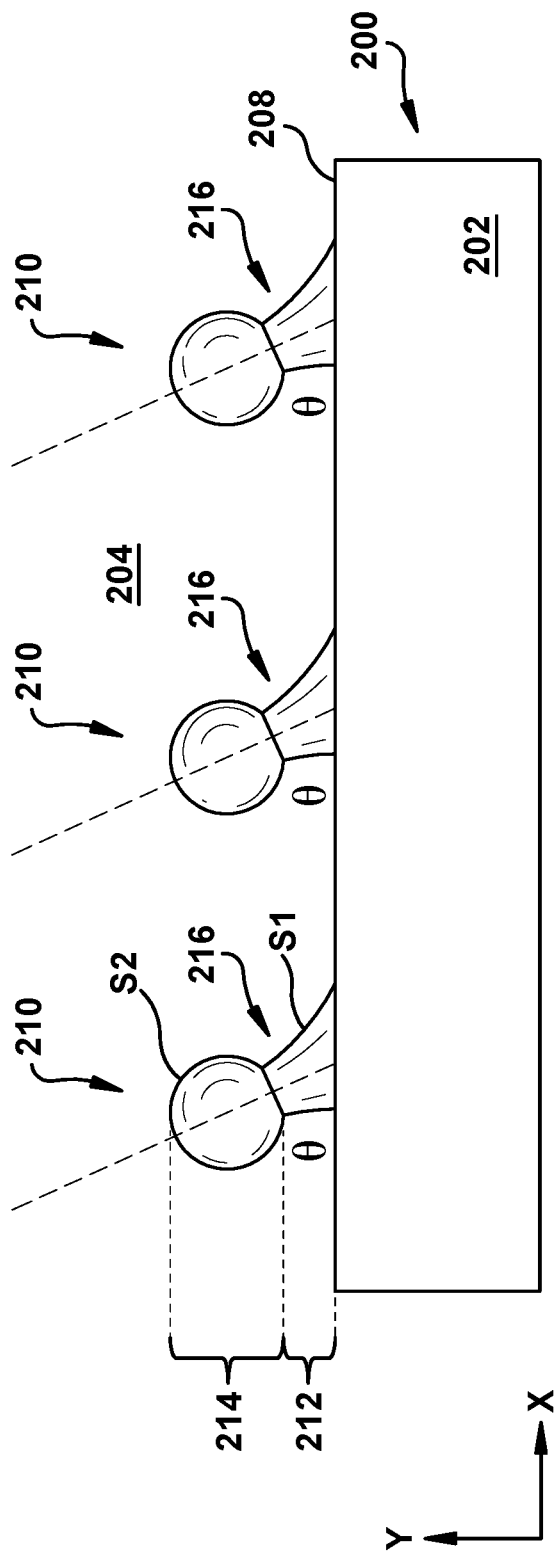
FIG. 9 shows a side view in plane X-Y of coating-capturing features extending non-perpendicularly from an exterior surface of a turbomachine component according to embodiments of the disclosure.

Turning to FIG. 9, coating-capturing features 210 with different orientations are shown according to embodiments of the disclosure. Although coating-capturing features 210 were shown by example in FIGS. 4-8 as being oriented perpendicularly outward from body 202 of turbomachine component 200, other implementations may differ. For example, a manufacturer or servicer may adjust the angular orientation of coating-capturing feature(s) 210, reducing the thickness of eventual surface coating(s) (FIG. 7) formed on coating-capturing feature(s) 210 in exchange for trapping additional coating material beneath coating-capturing feature(s) 210. According to an embodiment, coating-capturing features 210 may extend outward from body 202 at a non-perpendicular angle $\theta$ between a centerline axis C of coating-capturing feature 210 and the selected portion of pressure side surface PS or suction side surface SS. Non-perpendicular angle $\theta$ may denote the angular orientation of members 212, 214 with respect to body 202, and in still further embodiments each member 212, 214 of coating-capturing features 210 may have a distinct non-perpendicular angle $\theta$ with respect to body 202.

Figure 10:
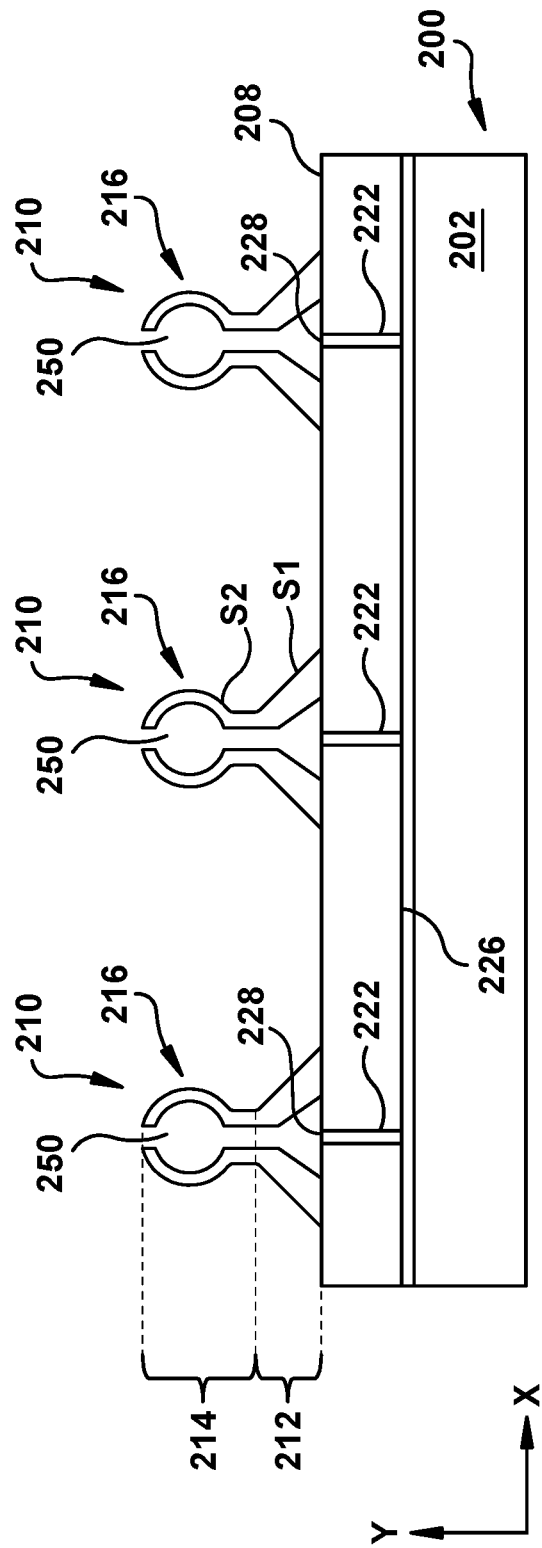
FIG. 10 shows a side view in plane X-Y of coating-capturing features each with a hollow interior according to embodiments of the disclosure.

Turning to FIG. 10, coating-capturing features 210 may optionally be structured to include additional internal features for capturing surface coating 230 and/or transmitting cooling fluids. Coating-capturing features 210 may optionally include a hollow interior 250 extending from within first member 212 to an outermost end of second member 214. Hollow interior 250 may be substantially cylindrical, or may have a profile similar to that of first and second member 212, 214 (e.g., a substantially spheroidal interior section within second member 214 above a substantially pyramidal interior section within first member 212). In any case, hollow interior 250 may be fluidly coupled to outlet(s) 228 from cooling passage(s) 222, to provide secondary cooling function in the event that surface coatings 230 degrade or break down. As noted elsewhere herein, cooling fluids may be transmitted through cooling passage(s) 222 and into hollow interior 250 to maintain a low temperature at exterior surface 206 of body 202. This alternative cooling may continue until it is possible to replace any lost portions of surface coating 230 on coating-capturing feature(s) 210.

Figure 11:
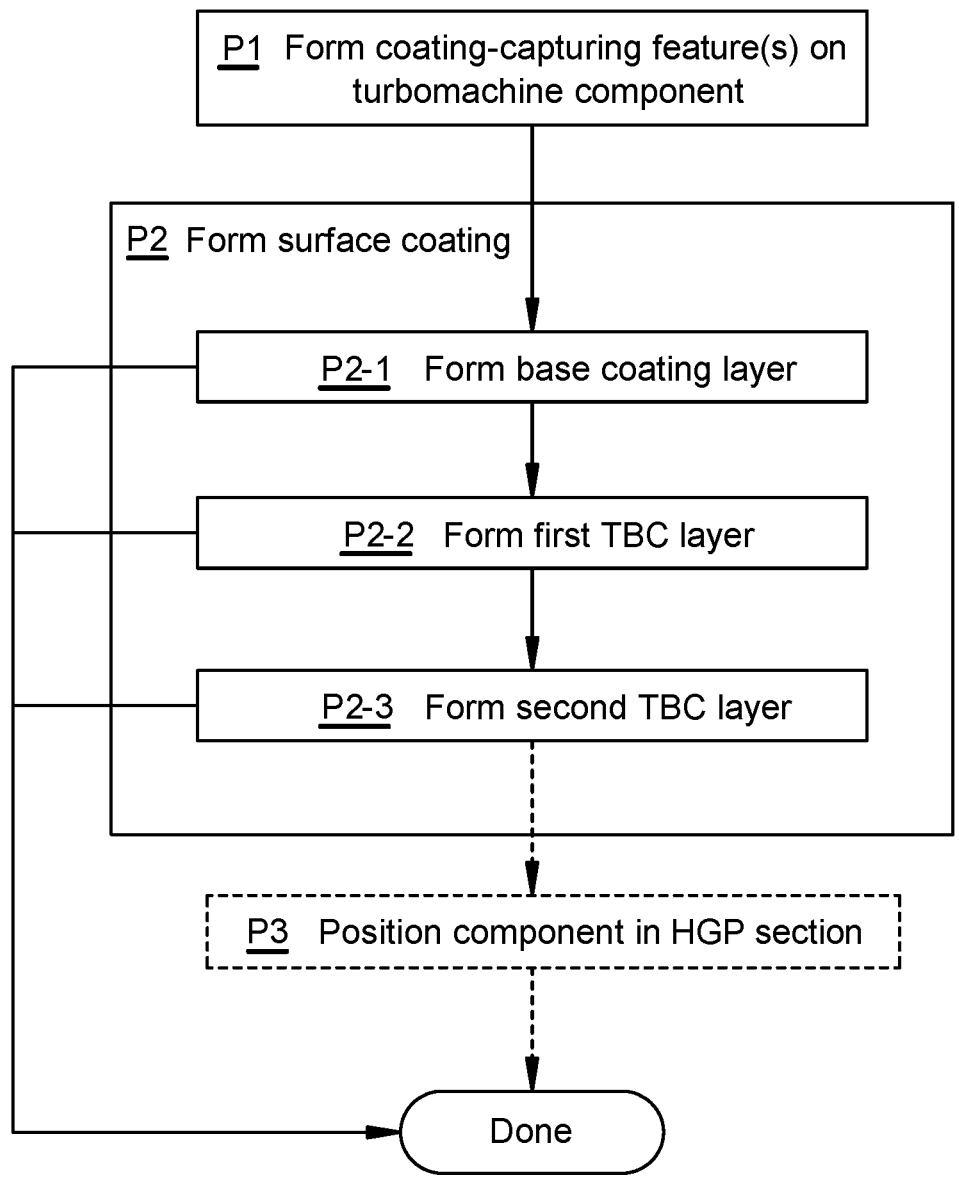
FIG. 11 shows an illustrative flow diagram of applying a coating to a turbomachine component according to embodiments of the disclosure.

Referring to FIGS. 7 and 11, the disclosure provides methods of forming surface coating 230 on turbomachine component 200 with the aid of coating-capturing features 210. A first process P1 includes forming turbomachine component 200 with one or more coating-capturing features 210 thereon. Turbomachine component 200 and coating-capturing features 210 may be formed together as portions of a single unit, or may be formed separately and coupled together using adhesive material 240 (FIG. 8) or by other bonding techniques currently known or later developed. Following process P1, turbomachine component 200 is ready to receive surface coating 230 for thermal insulation.

The method may then continue to process P2 of forming surface coating 230 on turbomachine component 200. Process P2 may be subdivided into multiple sub-processes P2-1, P2-2, P2-3, each corresponding to one layer of surface coating 230. Where surface coating 230 includes a different number of layers (e.g., one layer, two layers, more than three layers, etc.), the one or more sub-processes of process P2 may be omitted, or additional sub-processes may be added for any additional layers added to surface coating 230. In process P2-1, base coating layer 232 may be formed on body 202 of turbomachine component 200, as well as members 212, 214 and within indentation 216 of coating-capturing feature 210 as noted above. Base coating layer 232 may include a combination of metal and ceramic materials as noted above. After base coating layer 232 is formed, the method may continue to sub-process P2-2 of forming first TBC layer 234 on base coating layer 232. Additionally, the method may include another sub-process P2-3 of forming second TBC layer 236 on first TBC layer 234. TBC layers 234, 236 may include ceramic materials as noted above, and additionally may have different material compositions. After surface coating 230 is formed on turbomachine component 200 and coating-capturing feature 210 in process P2, the method may conclude ("Done"), or optionally proceed to additional processes.

In some instances, processes P1 and P2 may be implemented before turbomachine component 200 is installed within a turbomachine assembly, e.g., turbomachine 2 (FIG. 1). In this case, the method may continue to process P3 of installing turbomachine component 200 within an HGP section of turbomachine 2. Process P3 may entail, e.g., coupling turbomachine component 200 to a wheel, rotor, and/or other coupling component in fluid communication with HGP section 204 of turbomachine 2. Following process P3, turbomachine component 200 may be ready to operate within turbomachine 2 and protected from high temperatures in HGP section 204 with surface coating 230. The presence of coating-capturing features 210 on turbomachine component 200 will protect turbomachine component 200 from spalling while maintaining a low temperature as noted elsewhere herein. The method may then conclude ("Done") after turbomachine component 200 is positioned within an HGP section of turbomachine 2. A servicer or manufacturer may then initiate operation of turbomachine 2 with turbomachine component 200 and coating-capturing features 210 therein to provide greater thermal insulation than may be available without coating-capturing features 210.

It should be noted that in some alternative implementations, the acts described may occur out of the order noted or, for example, may in fact be executed substantially concurrently or in the reverse order, depending upon the act involved. Also, one of ordinary skill in the art will recognize that additional processes may be added.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A turbomachine component for a turbomachine comprising:
    a body having an exterior surface positioned within a hot gas path (HGP) section of the turbomachine; and
    a coating-capturing feature mounted on the exterior surface of the body and in thermal communication with the HGP section of the turbomachine, wherein the coating-capturing feature includes:
        a first member positioned on the exterior surface of the body, the first member having at least one outer sidewall defining a first perimeter of the coating-capturing feature,
        a second member positioned on the first member and having at least one outer sidewall defining a second perimeter of the coating-capturing feature, wherein the first member separates the second member from the exterior surface of the body,
        an indentation positioned between the first and second members, wherein at least a portion of the indentation has a width narrower than portions of the first and second members; and
        a cooling passage formed within the coating-capturing feature, wherein the cooling passage includes an inlet fluidly coupled to an interior of the body and an outlet fluidly coupled through the at least one outer sidewall of the first member or the at least one outer sidewall of the second member.

2. The turbomachine component of claim 1, wherein the coating-capturing feature and the body each include a laser-sintered metal.

3. The turbomachine component of claim 1, further comprising a surface coating positioned on the body and the coating-capturing feature, wherein the surface coating includes:
    a base coating layer conformally coated on the exterior surface of the body, the at least one sidewall of the first member of the coating-capturing feature, and the at least one sidewall of the second member of the coating-capturing feature, wherein the base coating layer is positioned at least partially within the indentation of the coating-capturing feature,
    a first thermal barrier coating (TBC) layer positioned on the base coating layer, and
    a second TBC layer positioned on the first TBC layer.

4. The turbomachine component of claim 3, wherein each of the base coating layer, the first TBC layer, and the second TBC layer have a different material composition.

5. The turbomachine component of claim 1, wherein the coating-capturing feature extends outward from the body at a non-perpendicular angle relative to the exterior surface of the body.

6. The turbomachine component of claim 1, wherein the body comprises part of a nozzle or a rotating blade positioned within the HGP section of the turbomachine.

7. The turbomachine component of claim 1, wherein the first member of the coating-capturing feature is frusto-pyramidal or frusto-conical, and wherein the second member of the coating-capturing feature is spheroidal.

8. The turbomachine component of claim 1, further comprising an adhesive bond interposed between the first member of the coating-capturing feature and the exterior surface of the body.

9. An apparatus comprising:
a turbomachine component having an exterior surface for positioning within a hot gas path (HGP) section of a turbomachine;
a coating-capturing feature mounted on the exterior surface of the turbomachine component and in thermal communication with the HGP section of the turbomachine, wherein the coating-capturing feature comprises:
a first member positioned on the exterior surface of the turbomachine component, the first member having at least one outer sidewall defining a first perimeter of the coating-capturing feature,
a second member positioned on the first member and having at least one outer sidewall defining a second perimeter of the coating-capturing feature, wherein the first member separates the second member from the exterior surface of the turbomachine component, and
an indentation positioned between the first and second members; and a surface coating comprising:
a base coating layer conformally coated on the exterior surface of the turbomachine component, the at least one sidewall of the first member of the coating-capturing feature, and the at least one sidewall of the second member of the coating-capturing feature, wherein the base coating layer is positioned at least partially within the indentation of the coating-capturing feature,
at least one thermal barrier coating (TBC) layer positioned on the base coating layer, wherein at least a portion of the indentation has a width narrower than portions of the first and second members, and
a cooling passage formed within the coating-capturing feature, wherein the cooling passage includes an inlet fluidly coupled to an interior of the turbomachine component and an outlet fluidly coupled through the at least one outer sidewall of the first member or the at least one outer sidewall of the second member.

10. The apparatus of claim 9, wherein each of the base coating layer and the at least one TBC layer have a different material composition.

11. The apparatus of claim 9, wherein the coating-capturing feature extends outward from the turbomachine component at a non-perpendicular angle relative to the exterior surface of the turbomachine component.

12. The apparatus of claim 9, wherein the first member of the coating-capturing feature is frusto-pyramidal or frusto-conical, and wherein the second member of the coating-capturing feature is spheroidal.

13. The apparatus of claim 9, wherein the turbomachine component and the coating-capturing feature each include a laser-sintered metal.

14. A turbomachine component for a turbomachine, comprising:
a body having an exterior surface positioned within a hot gas path (HGP) section of the turbomachine; and
a coating-capturing feature mounted on the exterior surface of the body and in thermal communication with the HGP section of the turbomachine, wherein the coating-capturing feature includes:
a first member positioned on the exterior surface of the body, the first member having at least one outer sidewall defining a first perimeter of the coating-capturing feature,
a second member positioned on the first member and having at least one outer sidewall defining a second perimeter of the coating-capturing feature, wherein the first member separates the second member from the exterior surface of the body, and
an indentation positioned between the first and second members,
wherein the coating-capturing feature includes a hollow interior extending from within the first member of the coating-capturing feature to an outermost end of the second member of the coating-capturing feature.

15. The turbomachine component of claim 14, wherein the coating-capturing feature includes an inlet fluidly coupled to an interior of the body and an outlet fluidly coupled through the at least one outer sidewall of the first member or the at least one outer sidewall of the second member.

16. The turbomachine component of claim 14, further comprising a surface coating positioned on the body and the coating-capturing feature, wherein the surface coating includes:
a base coating layer conformally coated on the exterior surface of the body, the at least one sidewall of the first member of the coating-capturing feature, and the at least one sidewall of the second member of the coating-capturing feature, wherein the base coating layer is positioned at least partially within the indentation of the coating-capturing feature,
a first thermal barrier coating (TBC) layer positioned on the base coating layer, and
a second TBC layer positioned on the first TBC layer.

17. The turbomachine component of claim 16, wherein each of the base coating layer, the first TBC layer, and the second TBC layer have a different material composition.

18. The turbomachine component of claim 14, wherein the coating-capturing feature extends outward from the body at a non-perpendicular angle relative to the exterior surface of the body.

19. The turbomachine component of claim 14, wherein the first member of the coating-capturing feature is frusto-pyramidal or frusto-conical, and wherein the second member of the coating-capturing feature is spheroidal.

* * * * *